United States Patent [19]
Hirata et al.

[11] Patent Number: 5,532,073
[45] Date of Patent: Jul. 2, 1996

[54] FUEL CELL

[75] Inventors: Haruhiko Hirata; Michio Hori, both of Kanagawa-ken; Toru Umiji, Tokyo, all of Japan

[73] Assignee: Kabushiki Kaisha Toshiba, Kanagawa-ken, Japan

[21] Appl. No.: 348,968

[22] Filed: Nov. 28, 1994

[30] Foreign Application Priority Data

Nov. 29, 1993 [JP] Japan .................................. 5-297976

[51] Int. Cl.⁶ .............................. H01M 8/04; H01M 8/02
[52] U.S. Cl. .................... 429/34; 429/35; 429/36; 429/37; 429/38
[58] Field of Search ............................ 429/34, 35, 36, 429/37, 38, 93

[56] References Cited

U.S. PATENT DOCUMENTS

| | | | |
|---|---|---|---|
| 4,604,331 | 8/1986 | Louis | 429/35 |
| 4,692,391 | 9/1987 | Hirota | 429/34 |
| 4,963,442 | 10/1990 | Marianowski et al. | 429/13 |
| 4,973,531 | 11/1990 | Zaima et al. | 429/37 |
| 5,084,364 | 1/1992 | Quaadvliet | 429/34 |

FOREIGN PATENT DOCUMENTS

| | | |
|---|---|---|
| 62-150667 | 7/1987 | Japan . |
| 63-53858 | 3/1988 | Japan . |
| 63-226885 | 9/1988 | Japan . |

OTHER PUBLICATIONS

"Measurement of gas leaks through the contacts between heat resistant alloys and YSZ plate", Naoya Tomita et al., Proc. of 33rd Battery Symposium in Japan, pp. 45–46, 1992. (month unknown).

Primary Examiner—Stephen Kalafut
Assistant Examiner—Richard H. Lilley, Jr.
Attorney, Agent, or Firm—Finnegan, Henderson, Farabow, Garrett & Dunner

[57] ABSTRACT

A fuel cell having a plurality of unit cells stacked in layers, each of the unit cells including an electrolyte and a pair of electrodes, each of the unit cells having a first primary surface and a second primary surface; a plurality of separator elements interposed between the adjacent unit cells, a fuel gas channel being formed on a side of the first primary surface of each of the unit cells and an oxidant gas channel being formed on a side of the second primary surface of each of the unit cells; and manifold portions each of which penetrates the separator elements in a thickness direction and gas-tightly communicates with each of the fuel gas channel and the oxidant gas channel through holes formed in the separator elements. Each of the manifold portions including a plurality of dielectric manifold ring, a plurality of spacer members arranged with the separator elements in a stacking direction and in contact with each other, and a manifold portion fastening mechanism for generating a fastening pressure for pressing the surfaces of the spacer members against surfaces of the associated separator elements. As a result, the surfaces of the spacer members and surfaces of the separator elements are held in mechanical contact with each other by the manifold portion fastening mechanism.

26 Claims, 9 Drawing Sheets

FUEL CELL

BACKGROUND OF THE INVENTION

1. Field of the Invention

The present invention relates to a fuel cell in which a plurality of unit cells are stacked, and more particularly to a fuel cell in which reliability of a gas seal performance of a manifold portion is improved and productivity and interchangeability of unit cells are also improved.

2. Description of the Related Art

As is well known, a "fuel cell" is a system for convening Gibbs free energy components directly into electric energy from a difference between a chemical potential of a fuel gas and an oxidant gas and a chemical potential of a product through their reaction.

For instance, in a fuel cell for convening chemical energy directly into electric energy, a pair of electrodes (i.e., an anode and a cathode) are arranged to clamp therebetween an electrolyte tile (layer) containing a molten carbonate as an electrolyte. In its basic operation, a fuel gas and an oxidant gas are separately supplied from both electrodes and are brought into contact with both electrodes to cause a reaction in the cell by shifting ions in the electrolyte. The flow of the ions in the electrolyte is tapped to the outside to obtain an electromotive force.

However, the electromotive force obtained by a unit cell is below 1 V at best. Therefore, in use as a power generation system having a high output, for the providing a large capacity, a fuel cell area is increased (for example, 1 m×1 m) and a plurality (for example several tens to about a hundred) of unit cells are stacked in series so that a fuel cell stacked structure is formed. The system is operated while electromotive pans are kept at a high temperature of about 600° to 700° C. to thereby obtain the total output of the respective unit cells.

An example of a conventional fuel cell will now be explained with reference to the drawings.

Figure 16:
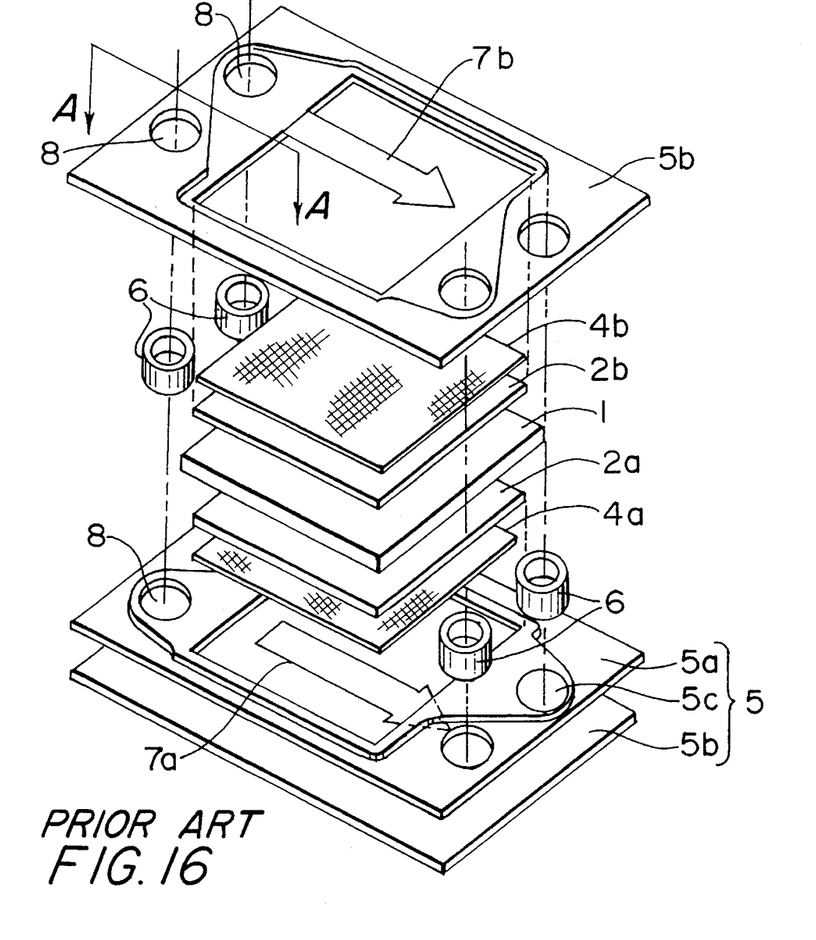
FIG. 16 is an exploded perspective view showing a primary structure of a conventional laminate type fuel cell.
Figure 17:
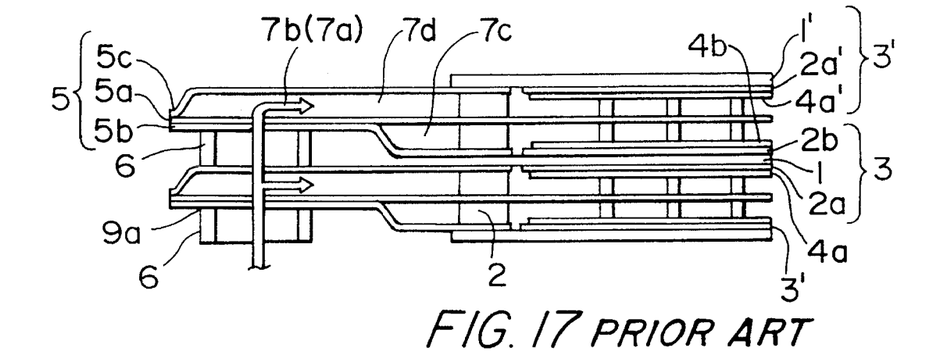
FIG. 17 is cross-sectional view A—A denoted in FIG. 16.

FIG. 16 is an exploded perspective view showing a primary pan of the conventional fuel cell laminate structure and FIG. 17 is a cross-sectional view taken along the line A—A of FIG. 16 and additionally shows portions of adjacent stacked unit cells.

A separator element 5 which is composed of separator members 5a, 5b and 5c is disposed on each primary surface of an electrolyte tile (i.e., electrolyte layer) 1 confronting with a unit cell 3 composed of an anode 2a and a cathode 2b through each collector plate 4a, 4b.

Also, a dielectric manifold ring (made of, for example, ceramic) 6 is sealingly connected to and laminated on the associated separator element 5.

In general, the separator members 5a, 5b and 5c are made of stainless steel in view of the demands of workability, heat-resistance and an anti-corrosion property against the electrolyte. In general, one side surface partitioned by the separator member 5a forms a fuel gas flow 7a (or an oxidant gas flow 7b) of a first unit cell 3 while the other side surface partitioned by the separator 5a forms an oxidant gas flow 7b (a fuel gas flow 7a) of a second unit cell 3'. The separator element 5 also serves as a fuel gas channel 7c (or an oxidant gas channel 7d) in a stacking direction and has a through holes 8 extending in the thickness direction in fluid communication with manifold rings 6. Since the respective separator elements 5 have to be prevented from short-circuiting with each other due to a mechanical contact, a dielectric property is required for the manifold rings 6 which are mechanically connected to the respective separator elements 5.

Also, it is important to maintain a sufficient spacing for the fuel gas channel 7c and the oxidant gas channel 7d so that the associated gas may be supplied or discharged through the respective channels. Namely, the supply of the fuel gas and oxidant gas to be required for power generation is attained in a bi-directional manner, i.e., in the stacking direction of the unit cells 3 and the interface direction of the unit cells 3. The manifold rings 6 are formed in the stacking direction, whereas the separator elements 5 are formed in the interface direction for the supply through the gas channels 7c and 7d. Then, in order that a gas-tight seal should be kept between the manifold rings 6 and the separator elements 5, in general, the connecting parts for these components are subjected to bonding with brazing 9a or high temperature adhesives or any other suitable sealant process.

As described above, in the fuel cell stack structure (i.e., stack type fuel cell), in general, the manifold rings are made of ceramic and the separator members 5a, 5b and 5c are made of metal. Accordingly, there is a large difference in thermal expansion coefficients between these two components.

As a result, during operation of the fuel cell at times when the temperature increases or decreases, thermal stresses are generated in the manifold rings 6, the separator elements 5 and the brazing material 9a or bonding material such as adhesives. In the case where the generated thermal stresses are large, the separation of the brazing material 9a or adhesives or the fracture of the manifold rings 6 can occur. Also, even in case of a medium amount of thermal stress, due to the accumulation of damage caused by the thermal stresses concomitant with the repeated temperature cycling, the separation or fracture of the brazing material 9a or adhesives can occur or the gas-tight integrity of the manifold portions would degrade.

If, the gas-tight integrity degrades, a degradation of the cell performance may occur due to the entry of the purge gas into the fuel gas and oxidant gas. Also there would be risk of combustion due to the mixture of the fuel gas and oxidant gas. This causes problems in operating reliability and safety. Furthermore, in the assembling work and the manufacturing work of the fuel cells, since the stacked separator elements 5 are bonded through the manifold rings 6, the step for stacking and arranging the unit cells 3 and 3' and the separator elements 5 would be complicated. In addition, after the stacking and arrangement, if a part of the unit cells 3 and 3' suffers any faults, it would be difficult to mount/dismount and interchange the unit cells, which leads to the problem in productivity.

SUMMARY OF THE INVENTION

An object of the present invention is to provide a fuel cell in which reliability of a gas seal for manifold portions is improved and an electric power generation function is stably attained.

Another object of the present invention is to provide a fuel cell in which an adverse affect of thermal stresses generated in the operation or assembling or manufacturing may be considerably reduced.

In order to achieve these and other objects, there is provided a fuel cell comprising:

a plurality of unit cells stacked in layers, each of the unit cells including an electrolyte and a pair of electrodes, each of the unit cells having a first principal surface and a second principal surface;

a plurality of separator elements interposed between the adjacent unit cells, a fuel gas channel being formed on a side of the first primary surface of each of the unit cells and an oxidant gas channel being formed on a side of the second primary surface of each of the unit cells; and manifold portions each of which penetrates the separator elements in a thickness direction and gas-tightly communicates with each of the fuel gas channel and the oxidant gas channel through holes formed in the separator elements;

each of the manifold portions including at least a dielectric manifold ring, a plurality of seal members each arranged with its surfaces in a stacking direction being in contact with each other, and a manifold portion fastening means for generating a pressure for pressing the surfaces of the seal members against surfaces of the associated separator elements whereby the surfaces of the seal members and the surfaces of the separator elements are in mechanical contact with each other by the manifold portion fastening means.

Each of the seal members includes a seal ring made of metal and having a restoration against the pressure of the manifold portion fastening means.

Each of the seal members may include a spacer having a rigidity against the pressure of the manifold portion fastening means.

Each of the unit cells is provided with an active portion for generating an electric power by a fuel gas and an oxidant gas supplied to the fuel gas channel and the oxidant gas channel, respectively. The fuel cell may further include an active portion fastening means for fastening the active portion of each of the unit cells in the stacking direction through the separator elements. The fastening pressure of the manifold portion fastening means is set to be larger than the pressure of the active portion fastening means.

DESCRIPTION OF THE PREFERRED EMBODIMENTS

Embodiments of the invention will now be described with reference to FIGS. 1 through 15.

Embodiment 1

Figure 1:
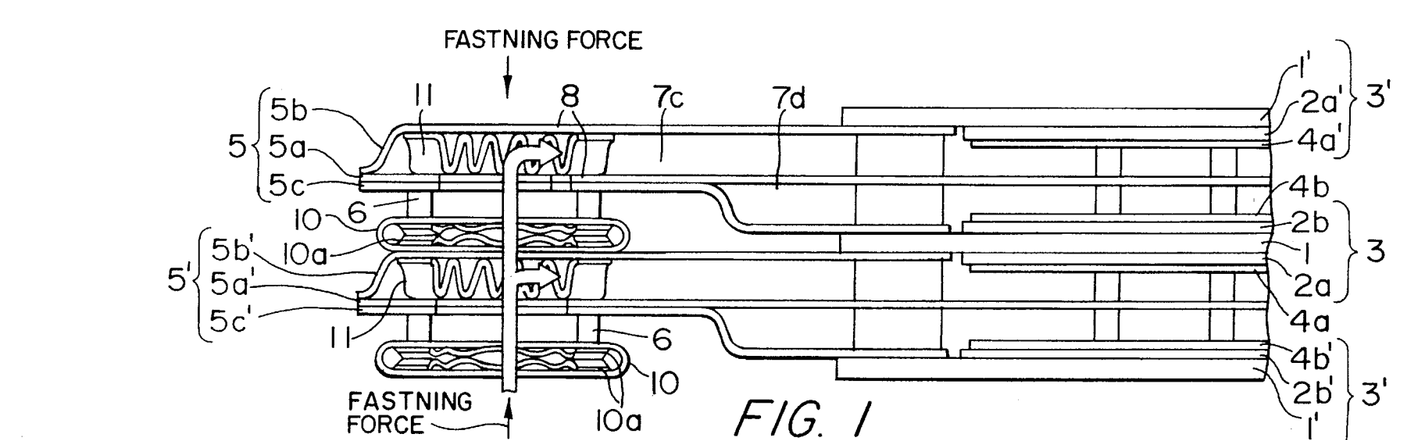
FIG. 1 is a cross-sectional view showing a portion of a fuel cell according to a first embodiment of the invention.
Figure 2:
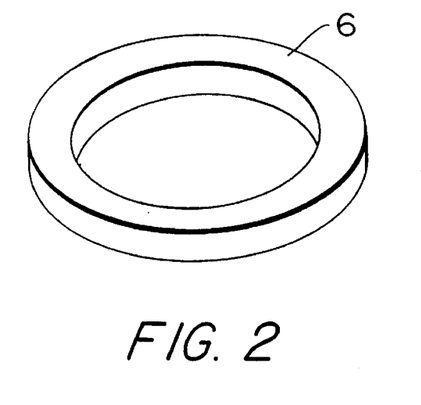
FIG. 2 is a perspective view showing a manifold ring used for forming a manifold portion of the fuel cell according to the first embodiment of the invention.
Figure 3:
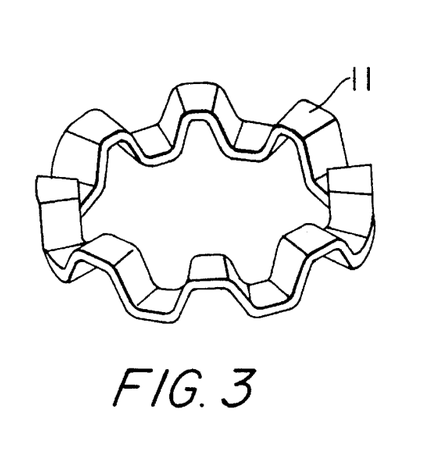
FIG. 3 is a perspective view showing a spacer incorporated in a separator element of the fuel cell according to the first embodiment of the invention.
Figure 4:
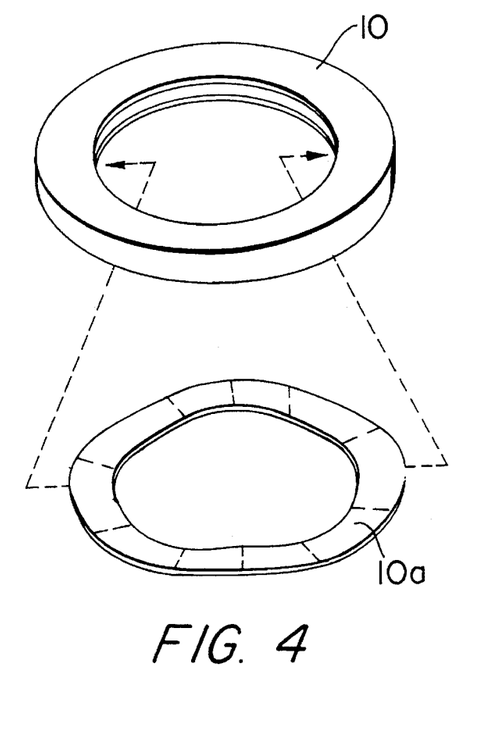
FIG. 4 is an exploded perspective view showing a structure of a seal ring and a spring of the fuel cell according to the first embodiment of the invention.

FIG. 1 is a cross-sectional view showing a first embodiment of the invention, and FIGS. 2 to 4 are perspective views showing primary parts used in the fuel cell in accordance with the first embodiment of the invention.

The fuel cell according to this embodiment is provided with unit cells 3 and 3' each of which is interposed between a pair of electrodes, i.e., anode 2a and cathode 2b on both primary surface sides of electrolyte 1. A separator element 5 composed of separator members 5a, 5b and 5c is disposed between the unit cells 3 and 3' along respective collectors 4a and 4b. Also, each interval between a plurality of separator elements 5 is sealed by a laminate of a dielectric manifold ring 6 made of dielectric ceramic and a seal ring 10 made of metal to thereby form a desired gas channel 7c, 7d.

The manifold ring 6 and the seal ring 10 are laminated and interposed between the separator elements 5 and serve as a fuel gas channel 7c or an oxidant gas channel 7d.

FIG. 2 is a perspective view showing a specific structure of the manifold ring 6. The manifold ring 6 is made of ceramics (ex. alumina, zirconia, magnesia, aluminum nitride, silicon nitride), and has a outer diameter of 100~200 mm and a thickness of 3~8 mm, assuming that the unit cell 3 has an area of 1 m×1 m.

In the structure thus described, the metallic separator members 5a, 5b and 5c are made of stainless steel in order to meet the requirements such as workability, heat-resistance, and an anti-corrosion property against the electrolyte, or the like. The metallic separator members 5a, 5b and 5c are provided with through-holes 8 extending in the stacking direction in order to form the gas channel in the stacking direction. While using the separator member 5a as a partitioning wall, the fuel gas channel 7c (or the oxidant gas channel 7d) to the unit cell 3 is formed between the separator members 5a and 5b, and the oxidant gas channel 7d (or the fuel gas channel 7c) to the unit cell 3 is formed between the separators 5a and 5c.

In order to keep the fuel gas channel 7c and the oxidant gas channel 7d defined by the separator members 5a, 5b and 5c, sufficiently wide, and in order to keep a flatness of the separator element 5 in the manifold portion to thereby ensure a good contact between the separator element 5 and the manifold ring 6 or the seal ring 10, a spacer 11 having a structure shown in, for example, a perspective view of FIG. 3 is installed.

The spacer 11 is made of material having a rigidity sufficient to with stand a fastening force to be described later, and more particularly is made of stainless steel or heat-resistant metal such as Ni based alloy material or Cr based alloy material. The spacer 11 is made of ceramics selected from alumina, zirconia, magnesia, aluminum nitride (AlN), silicon nitride ($SiN_2$) or the like.

In view of the requirement that the seal ring 10 requires deformability against the fastening force, the seal ring 10 is a made of metal such as stainless steel or the like. The seal ring 10 incorporates therein a member such as a spring 10a that is elastically deformable and restorable (with the deformability and the restorability) in correspondence with the fastening operation or the releasing operation. Namely, the seal ring 10 is so constructed that when the manifold portion for sealing and connecting the portion of the fuel gas channel 7c or the oxidant gas channel 7d to the unit cells 3 and 3' is fastened by a predetermined force, the seal ring 10 is deformed and restored by the magnitude of the fastening force.

FIG. 4 is an exploded perspective view showing the seal ring 10 and the spring 10a having deformability and the restorability.

According to the invention, the separator element 5, the manifold ring 6, the seal ring 10 incorporating the spring 10a and the separator element 5 which form a gas channel in the stacking direction are laminated in this order with their surfaces and end faces in contact with each other. These components are fastened and sealed by a predetermined fastening force in the stacking direction to thereby form the manifold portion.

In the embodiment, a part of the gas channel in the stacking direction is formed by the metallic seal ring 10 incorporating the spring 10a. For this reason, even if a creep deformation is applied to the electrolyte tile 1 during power generating operation so that a distance between the separator elements 5 is shortened, the changed distance may be absorbed by the restorable deformation of the metallic seal ring 10a incorporating the spring 10.

In such a structure for the manifold portion, the separator element 5 and seal ring 10 both of which are made of metal and the manifold ring 6 which is made of ceramic are used in combination, and hence, there is a difference in thermal expansion among these components. However, these components are simply in mechanical contact with each other, and hence, the generation of the thermal stresses caused by the difference in thermal expansion due to temperature increase/decrease during power generation of the fuel cell may be canceled. Accordingly, the fracture of the manifold ring 6 which is experienced in the conventional system due to thermal stresses is avoided and the high reliability for the gas seal may be insured.

Furthermore, since the manifold portion has a structure based upon a combination of mechanical contacts, not only the assembling work and the manufacturing work are simplified but also the interchangeability of the structural parts of the unit cells 3 and 3' is simple. This results in advantages relating to productivity and ease of maintenance.

In the structure of the stack type fuel cell where the unit cells 3 and 3' are arranged in stacking, it is possible to bond the metallic seal ring 10 and the separator element 5 by, for example, brazing, welding or adhering with high temperature adhesives in advance prior to the stacking arrangement. In this case, the manufacturing process may be facilitated and the gas seal properly may be improved. Also, for spacer 11 incorporated in the separator element, it is possible to apply the confronting separator members 5a, 5b and 5c by, for example, brazing, welding or adhering with high temperature adhesives in advance prior to the lamination arrangement. In this case, the manufacturing process may be facilitated.

Furthermore, it is possible to maintain a good gas seal property for a long period of time if fine particles of ceramics such as boron nitride or alumina which is usually used as a mold-separation agent or particles of low melting point glass are interposed on the contact surfaces or peripheral surfaces of the solid members, constituting the manifold portion, i.e., the separator element 5, the manifold ring 6 made of ceramic and the seal ring 10. Moreover, in this case, it is possible to prevent adhesion between the components that would otherwise be caused by high temperature, and therefore it is easy to remove the components. Accordingly, it is possible to easily perform the removal work when the unit cells, which suffer from faults, out of the laminated unit cells are to be replaced by new ones.

Figure 5:
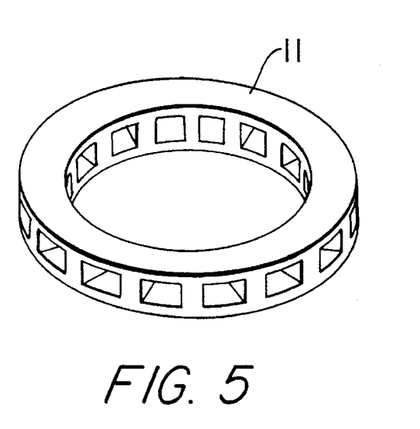
FIG. 5 is a perspective view showing a structure of a spacer incorporated into the separator element of the fuel cell according to the first embodiment of the invention.

FIG. 5 shows a modification of the first embodiment of the invention as a perspective view illustrating another structure of the spacer 11 incorporated in the separator element 5. This modification represents an alternative structure for obtaining a good contact between the separator element 5 and the manifold ring 6 or the seal ring 10 while maintaining a good flatness of the separator element 5.

In particular, the spacer 11 according to this modification is formed so that a top surface and a bottom surface thereof are flat. In the case where the top and bottom surfaces of the spacer 11 are thus made flat, the flatness of the separator 5 may be maintained in a good condition. When the fastening force is applied thereto, the contact among the members constituting the manifold portion and confronting each other may be further kept in a better condition, which contributes to the formation of the gas-tight seal and contact.

Second Embodiment

Figure 6:
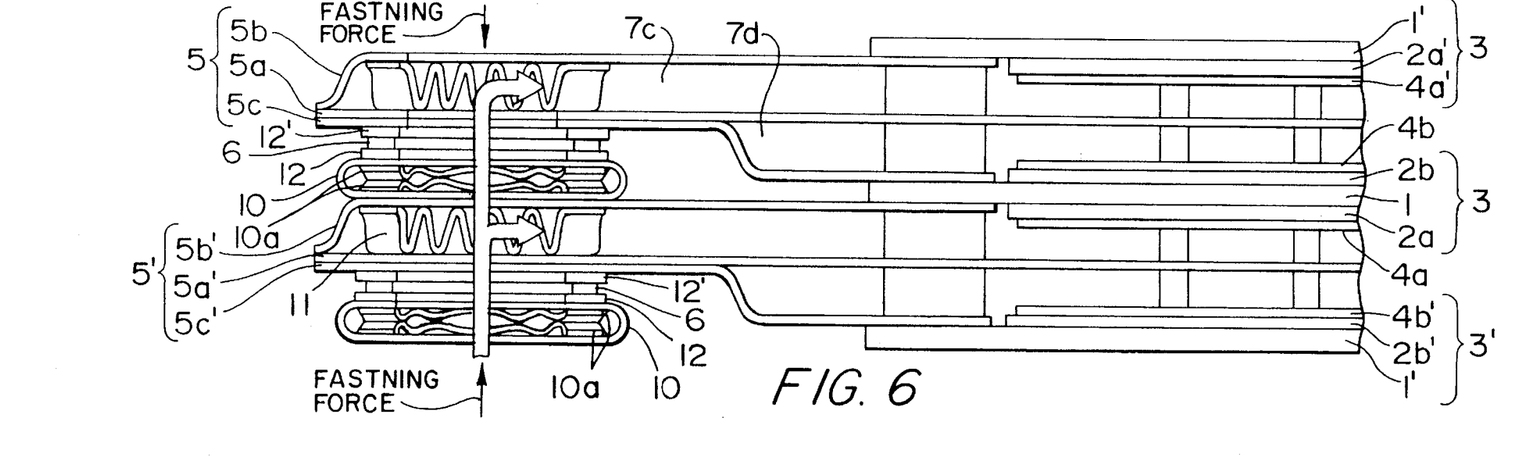
FIG. 6 is a cross-sectional view showing a structure of a portion of a fuel cell according to a second embodiment of the invention.

FIG. 6 is a cross-sectional view showing a primary structure of a fuel cell in accordance with a second embodiment of the invention. In contrast to the first embodiment shown in FIG. 1, this embodiment is characterized in that each manifold ring 6 made of ceramic is provided to be thinner than the first embodiment and thick plate rings 12 and 12' made of metal are laminated on both sides of the manifold ring 6 to form a predetermined gas channel. The other structure thereof is basically the same as that of the first embodiment.

The gas seal structure of the manifold portion according to the second embodiment is formed by laminating the separator member 5b, the seal ring 10, the thick plate ring 12, the manifold ring 6, the thick plate ring 12' and the separator member 5c with contact surfaces adjacent to and in contact with each other, and by fastening these components in the stacking direction. Since the flatness of the thick plate rings 12 and 12' is more stable due to rigidity, as compare to the thin plate separator members 5b and 5c and the seal ring 10, it is possible to maintain better a contact condition with the manifold ring 6.

Also, in the second embodiment, since the solid members that constitute the manifold portion are in a simple mechanical contact, it is possible to cancel the generation of the thermal stresses caused by the difference in thermal expansion coefficients during temperature increase/decrease during power generation of the fuel cell. It is therefore possible to avoid the fracture or the like of the manifold ring 6 due to the thermal stresses. Accordingly, it is possible to insure high gas-tight reliability. Furthermore, since the structure of the manifold portion is based upon the combination of mechanical contacts, the assembling work and the manufacturing work may be simplified and the disassembly work for interchanging unit cells which suffer from faults, out of all the unit cells forming the laminate, with new ones may readily be carried out.

In assembling and manufacturing the components, prior to the stacking and the arrangement of the separator member 5b, the seal ring 10, the thick plate ring 12, the thick plate ring 12' and the separator member 5c, if the respective components are bonded by brazing, welding, or adhering with high temperature adhesive, it is possible to improve the gas seal property and the assembling workability.

Third Embodiment

Figure 7:
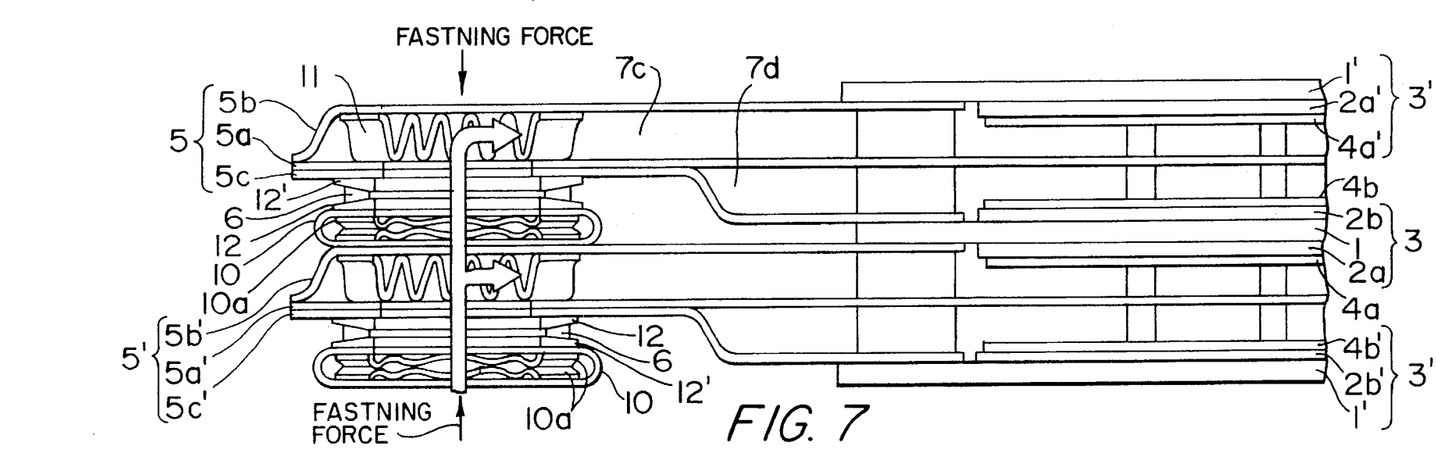
FIG. 7 is a cross-sectional view showing a portion of a fuel cell according to a third embodiment of the invention.

FIG. 7 is a cross-sectional view showing a structure of a fuel cell according to a third embodiment of the invention. In contrast to the embodiment shown in FIG. 6, this embodiment is characterized in that a thickness of an inner circumferential portion of the manifold ring 6 made of ceramic is smaller than that of an outer circumferential portion thereof, whereas a thickness of an outer circumferential portion of each of the metallic thick plate ring 12, 12" is tapered to be smaller than that of an inner circumferential portion thereof. Then, the thick plate rings 12 and 12' are laminated on and aligned with both surfaces of the manifold ring 6 to form a predetermined gas channel.

The other structure of the third embodiment is basically the same as that of the foregoing embodiment.

Also, the gas seal structure of the manifold portion according to the third embodiment is formed by laminating the separator member 5b, the seal ring 10, the thick plate ring 12, the manifold ring 6, the thick plate ring 12' and the separator member 5c with the contact surfaces adjacent to and in contact with each other and by fastening these components in the stacking direction.

Also, in this embodiment, during temperature increase/decrease during power generation of the fuel cell, since there is a difference in thermal expansion between the manifold ring 6 and the thick plate rings 12 and 12', a deformation will occur in which the radius of manifold ring 6, thick plate rings 12 and 12' is increased due to thermal expansion. Then, the deformation of the thick plate rings 12 and 12' made of metal is larger so that the contact surface is pushed from the inner circumferential side to the outer circumferential side. As a result, the contact force therebetween becomes stronger to enhance the gas seal property.

In addition, since the solid members that constitute the manifold portion are in simple mechanical contact, it is possible to cancel the generation of the thermal stresses caused by the difference in thermal expansion during the temperature increase/decrease during power generation of the fuel cell. It is therefore possible to avoid the fracture or the like of the manifold ring 6 due to the thermal stresses. Accordingly, it is possible to insure high gas seal reliability. Furthermore, as the structure of the manifold portion is based upon the combination of mechanical contacts, the assembling work and the manufacturing work may be simplified and the disassembly work for interchanging the unit cells which suffer from faults, out of all the unit cells forming the laminate, with new ones may readily be carried out.

In assembling and manufacturing the components, prior to the stacking and the arrangement of the separator member 5b, the seal ring 10, the thick plate ring 12, the thick plate ring 12' and the separator member 5c, if the respective components are bonded by brazing, welding, or adhering with high temperature adhesive, it is possible to improve the gas seal property and the assembling workability.

Fourth Embodiment

Figure 8:
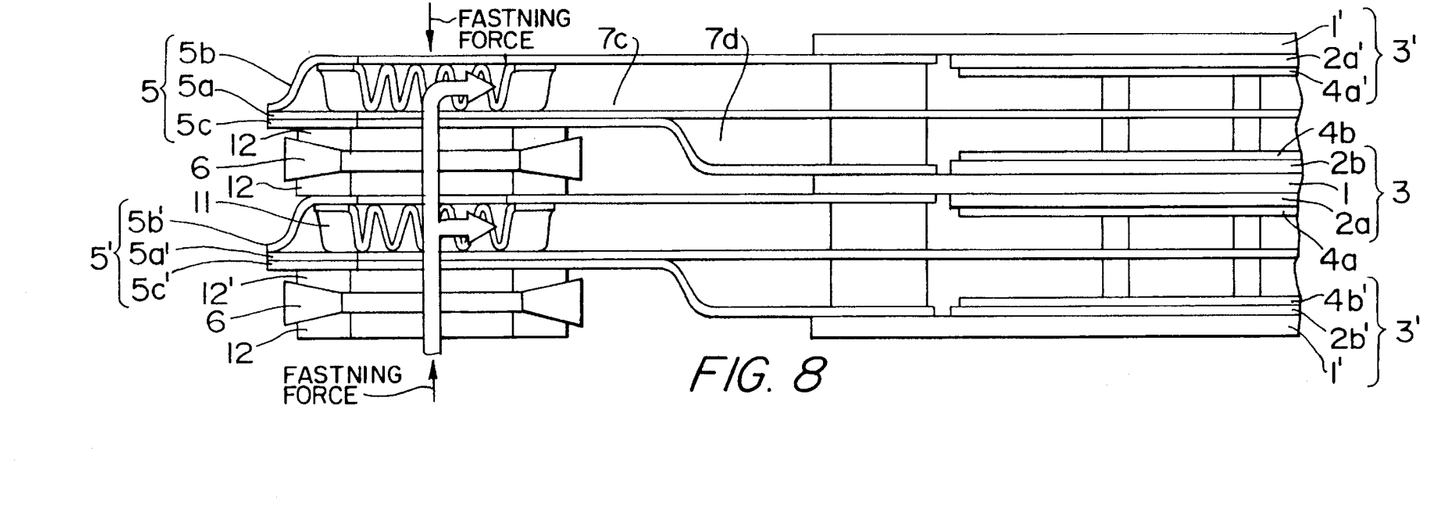
FIG. 8 is a cross-sectional view showing a portion of a fuel cell according to a fourth embodiment of the invention.

FIG. 8 is a cross-sectional view showing a structure of a fuel cell according to a fourth embodiment of the invention. In contrast to the embodiment shown in FIG. 7, this embodiment is characterized in that the manifold portion is formed by solid members only composed of the manifold ring 6 made of ceramic and the thick plate rings 12 and 12' made of metal (in which the seal ring 10 is dispensed with). A thickness of an outer circumferential portion of the manifold ring 6 is larger than that of an inner circumferential portion thereof, whereas a thickness of an inner circumferential portion of each of the metallic thick plate ring 12, 12" is tapered to be smaller than that of an outer circumferential portion thereof. While, the thick plate rings 12 and 12' are laminated on and aligned with both surfaces of the manifold ring 6 to form a predetermined gas channel.

The other structure of the fourth embodiment is basically the same as that of the foregoing embodiment.

Also, the gas seal structure of the manifold portion according to the fourth embodiment is formed by laminating the separator member 5b, the thick plate ring 12, the manifold ring 6, the thick plate ring 12' and the separator member 5c with the contact surfaces adjacent to and in contact with each other and by fastening these components in the stacking direction.

In this embodiment, the creep deformation of the electrolyte tile 1 is absorbed by the deformation of the separator members 5a, 5b and 5c. Also, in this embodiment, during the temperature increase/decrease during power generation of the fuel cell, since there is a difference in thermal expansion coefficients of between the manifold ring 6 and the thick plate rings 12 and 12', a deformation will occur in which the radius of manifold ring 6, thick plate rings 12 and 12' is increased due to thermal expansion. Then, the deformation of the thick plate rings 12 and 12' made of metal is larger so that the contact surface is pushed from the inner circumferential side to the outer circumferential side. As a result, the contact force therebetween becomes stronger to thereby enhance the gas seal property.

In addition, since the solid members that constitutes the manifold portion are in simple mechanical contact, it is possible to cancel the generation of the thermal stresses caused by the difference in thermal expansion during the temperature increase/decrease during power generation of the fuel cell. It is therefore possible to avoid the fracture or the like of the manifold ring 6 due to the thermal stresses. Accordingly, it is possible to insure high gas seal reliability. Furthermore, as the structure of the manifold portion is based upon the combination of mechanical contacts the assembling work and the manufacturing work may be simplified and the disassembly work for interchanging the unit cells which suffer from faults, out of all the unit cells forming the laminate, with new ones may readily be carried out.

In assembling and manufacturing the components, prior to the lamination and the arrangement of the separator member 5b, the seal ring 10, the thick plate ring 12, the thick plate ring 12' and the separator member 5c, if the respective components are bonded by brazing, welding, or adhering with high temperature adhesive, it is possible to improve the gas seal property and the assembling workability.

Fifth Embodiment

Figure 9:
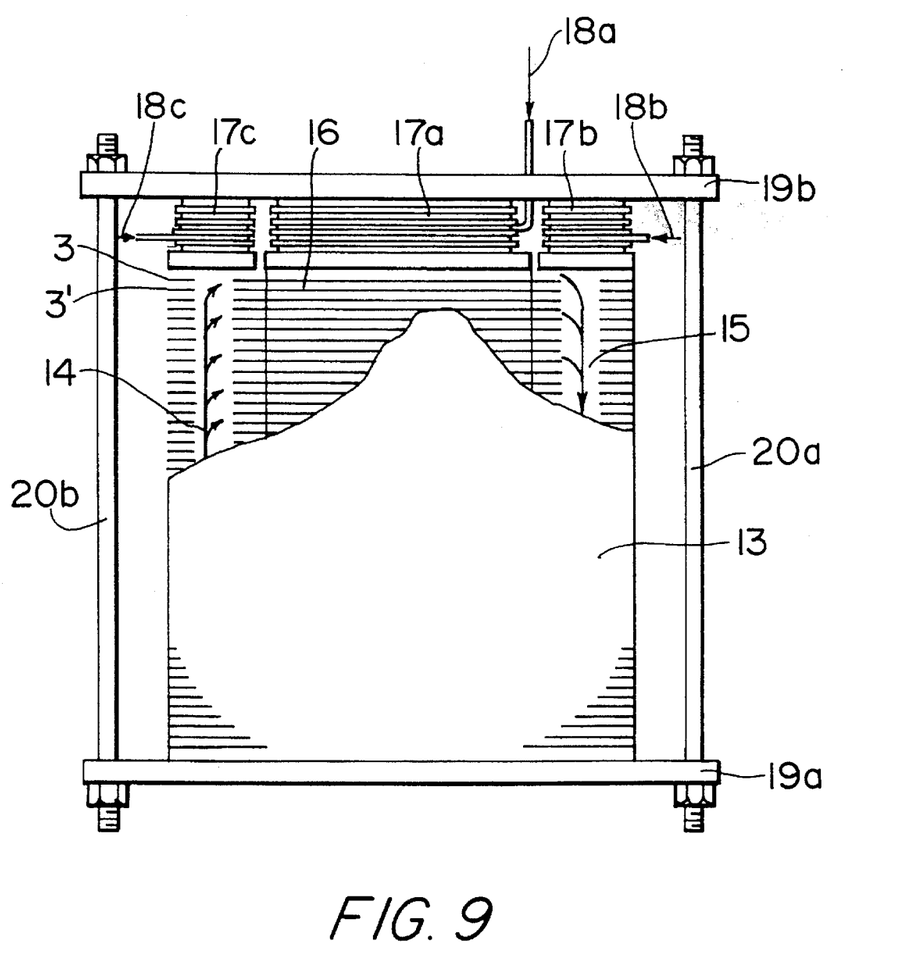
FIG. 9 is a cross-sectional view showing a portion of a fuel cell according to a fifth embodiment of the invention.

FIG. 9 is a cross-sectional view showing a primary structure of a fuel cell in accordance with a fifth embodiment of the invention.

In FIG. 9, the fuel cell stack 13 is structured so that separator elements are disposed through respective collector plates between unit cells each having an electrolyte tile which is clamped by an anode and a cathode on both primary surfaces thereof. The fuel cell stack 13 is mainly composed of a manifold portion 14 for supplying a predetermined fuel gas and a predetermined oxidant gas to the unit cells, a manifold portion 15 for discharging the fuel gas and oxidant gas, and an active portion 16.

Also, gas-tight bellows 17a, 17b and 17c are disposed above the fuel cell stack 13 and serve to fasten, in the stacking direction, each of the active portion 16, the manifold portion for supplying the gas and the manifold portion for discharging the gas by the pressure to be supplied and discharged from gas supply and discharge ports 18a, 18b and 18c. The fuel cell stack 13 is provided with a lower fastening plate 19a and an upper fastening plate 19b. The fuel cell stack 13 and the gas-tight bellows 17a, 17b and 17c are fixed while keeping a predetermined positional relation by the fastening force of fastening rods 20a and 20b for fixing the lower fastening plate 19a and the upper fastening plate 19b.

In this arrangement, a gas which is kept at a higher pressure than that of an ambient gas within a vessel for encasing the fuel cell stack 13 is supplied to the gas-tight bellows 17a, 17b and 17c. A compression force is applied to the fuel cell stack 13 by the high pressure gas, so that the electric contact and gas seal are maintained in the active portion of the unit cells, and furthermore, the gas seal is maintained in the manifold portions 14 and 15. Then, by making different the supply pressures of the high pressure gas to the gas-tight bellows 17a, 17b and 17c, it is possible to control the fastening force for the active portion and the fastening force for the manifold portions 14 and 15, respectively, at optimum levels. Such control of fastening forces makes it possible to control the contact surface pressure for the active portion and the contact surface pressure for the manifold portions 14 and 15, respectively and independently, and to control them under optimum conditions in response to the operation status. In particular, by keeping the contact surface pressure for the manifold portions 14 and 15 at a higher level than the contact surface pressure for the active portion, it is possible to keep a good sealability of the manifold portion.

Furthermore, in this arrangement, as mentioned above, the contact surface pressures are controlled under optimum conditions for the manifold portions 14 and 15 and the active portion 16 by selectively setting the fastening forces for the gas-tight bellows 17a, 17b and 17c, respectively. Accordingly, the contact surface pressure of the manifold portions 14 and 15 is set at a higher level than that of the active portion 16, it is possible to keep a good gas sealability of the manifold portions. However, for instance, depending upon the laminate condition of the fuel cells, it is possible to inversely set the fastening force of the active portion 16 at a level higher than or equal to that of the manifold portions 14 and 15.

Figure 10:
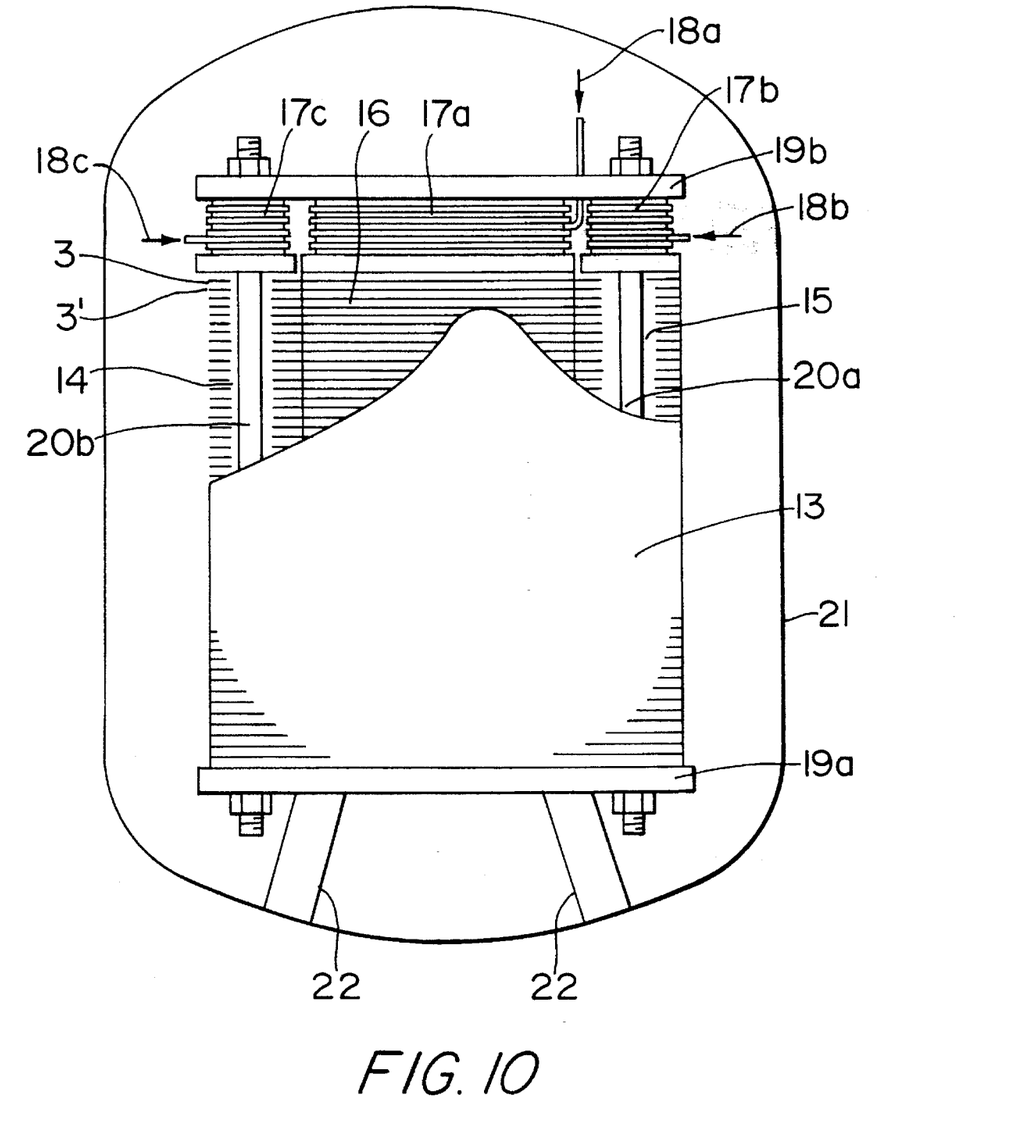
FIG. 10 is a cross-sectional view showing a modification of the fuel cell according to the fifth embodiment of the invention.

FIG. 10 is a cross-sectional view showing a primary structure of the fuel cell according to the modification of the fifth embodiment of the invention. In this example, in fastening and fixing the lower fastening plate 19a and the upper fastening plate 19b by the fastening rods 20a and 20b for the fuel cell stack 13 and the gas-tight bellows 17a, 17b and 17c, the insertion positions of the fastening rods 20a and 20b are set at the manifold portions 14 and 15 to maintain a predetermined positional relation thereamong. In this case, in comparison with the arrangement according to the fifth embodiment shown in FIG. 9, it is possible to achieve a more compact arrangement. In FIG. 10, reference numeral 21 denotes a vessel and reference numeral 22 denotes fuel cell support members.

Figure 11:
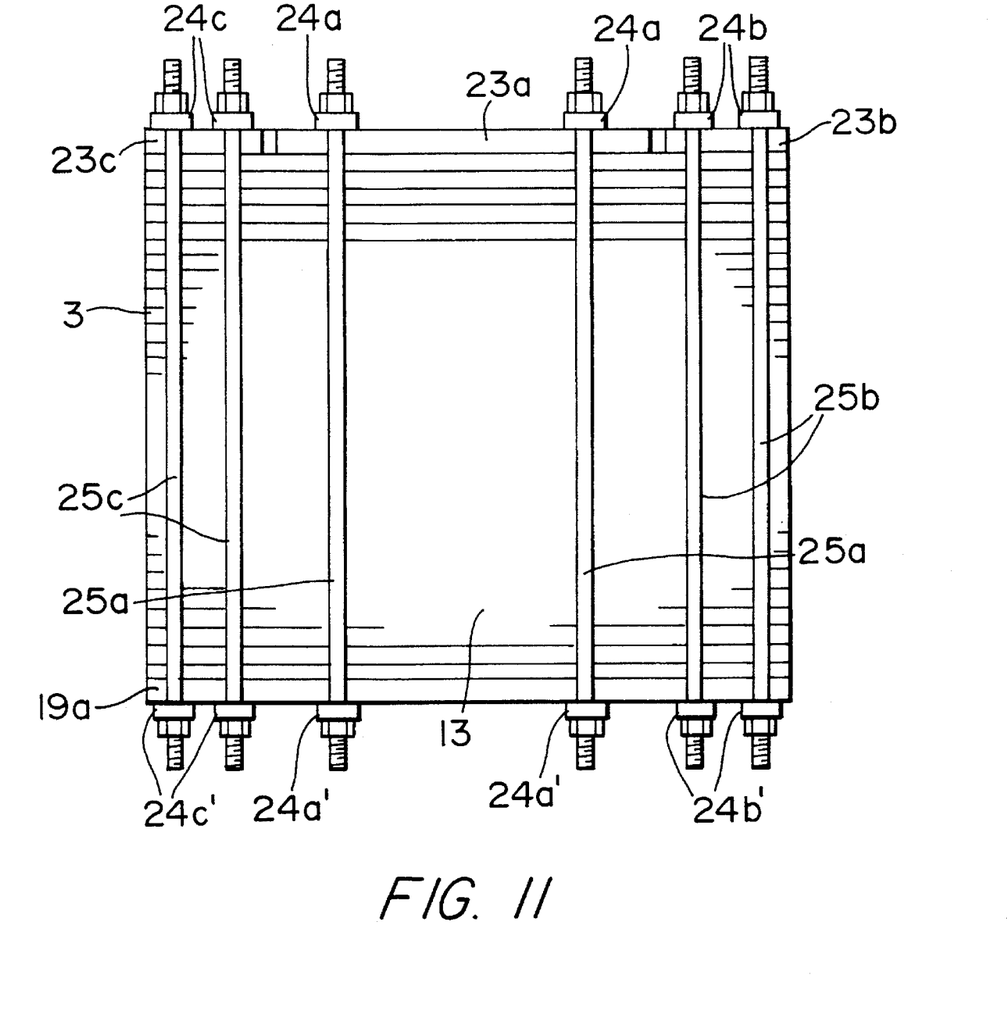
FIG. 11 is a cross-sectional view showing another modification of the fuel cell according to the fifth embodiment of the invention.

FIG. 11 is a cross-sectional view showing a primary structure of the fuel cell according to another modification of the fifth embodiment of the invention. In this example, instead of the gas-tight bellows 17a, 17b and 17c, upper fastening plates 23a, 23b and 23c are disposed, respectively, for fuel cell stack 13 and manifold portions 14 and 15, and are fastened in the stacking direction by fastening rods 25a, 25b and 25c through upper plate springs 24a, 24b and 24c and lower plate springs 24a', 24b' and 24c'. Also in such an arrangement, it is possible to control the contact pressures for the active portion and the manifold portions 14 and 15 to optimum conditions, respectively and independently. Then, in this arrangement, it is possible to dispense with the gas-tight bellows 17a, 17b and 17c that are relatively expensive, thereby saving cost and making the apparatus compact.

Sixth Embodiment

In general, when the number of the stacked unit cells is increased in the fuel cell, it may be difficult to supply and discharge gas along the stacking direction. To obviate such possible difficulty, in accordance with the sixth embodiment, a structure is provided in which an intermediate gas header is disposed in an intermediate portion of the unit cells in the stacking direction.

Figure 12A:
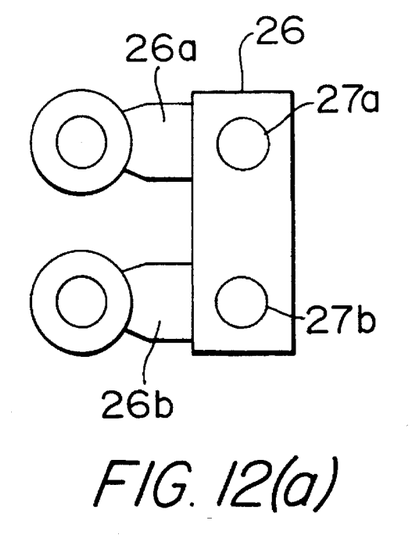
FIGS. 12(a) and 12(b) are a schematic plan view and a schematic side elevational view of a primary part of an intermediate gas header according to a sixth embodiment of the invention.
Figure 12B:
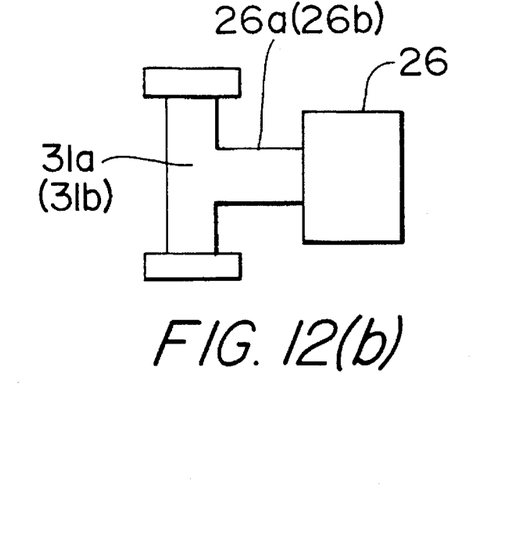
Figure 13:
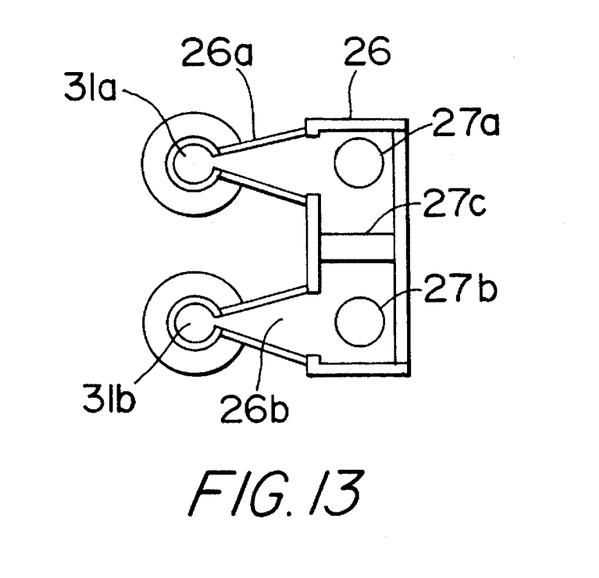
FIG. 13 is a cross-sectional view showing the intermediate gas header in accordance with the sixth embodiment of the invention.
Figure 14:
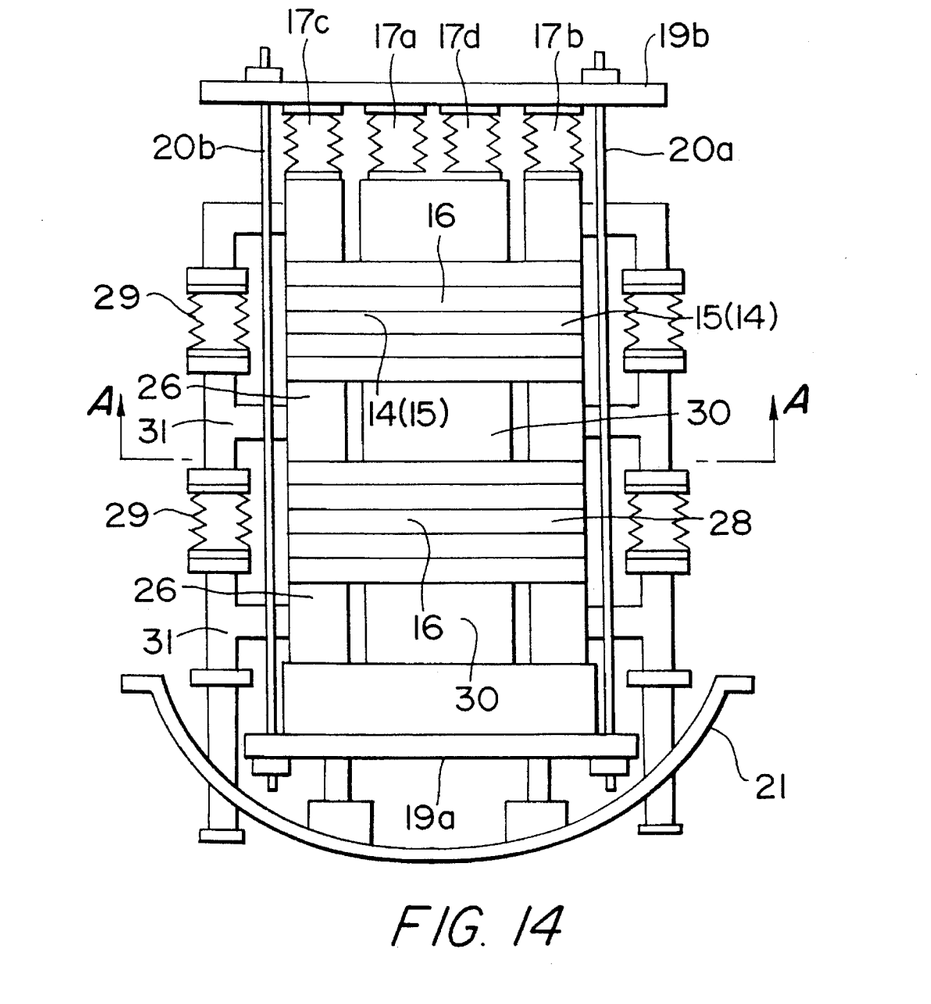
FIG. 14 is a side elevational view showing a fuel cell provided with the intermediate gas header according to the sixth embodiment of the invention.
Figure 15:
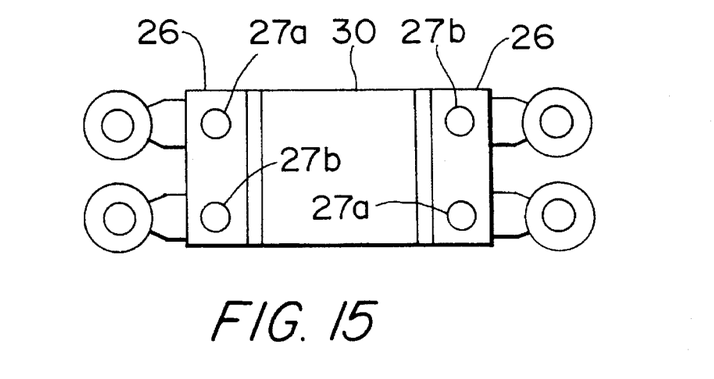
FIG. 15 is a plan view showing the fuel cell according to the sixth embodiment of the invention.

FIGS. 12 to 15 show a portion of the fuel cell provided with such an intermediate gas header. FIGS. 12 (a) and 12 (b) are a schematic plan view and a schematic side elevational view of the intermediate gas header, respectively. FIG. 13 is a cross-sectional view showing the intermediate gas header. FIG. 14 is a side elevational view showing the fuel cell provided with the intermediate gas header. FIG. 15 is a plan view taken along the line A—A of FIG. 14.

In FIGS. 12 (a) and 12 (b), an intermediate gas header 26 having an oxidant gas supply passage (or an oxidant gas discharge passage) 26a and an oxidant gas supply passage (or an oxidant gas discharge passage) 26b form a part of the manifold portion 14 (15). These supply passages or discharge passages 26a, 26b are branched from a fuel gas supply pipe (or a fuel gas discharge pipe) 31a and an oxidant gas supply pipe (or an oxidant gas discharge pipe) 31b. The intermediate gas header 26, as shown in cross-section of FIG. 13, has a box-shaped internal space that is gas-tightly partitioned by a partitioning plate 27c, and a fuel gas supply port (or a fuel gas discharge port) 27a and an oxidant gas supply port (or an oxidant gas discharge port) 27b are formed.

The supply ports or discharge ports 27a, 27b are connected, respectively, to the manifold portion of laminated units of cells 28 (FIG. 14) arranged vertically to form the desired manifold portion 14, 15. The fuel gas supply pipes (or fuel gas discharge pipes) 31a and the oxidant gas supply pipes (or oxidant gas discharge pipes) 31b are connected to the fuel gas supply pipe pipes (or fuel gas discharge pipes) 31a and the oxidant gas supply pipes (or oxidant gas discharge pipes) 31b of another intermediate gas header 26 or the like through extendable joint pipes 29 (FIG. 14) to supply the gas to each cell through the manifold portion 14, 15.

FIG. 14 is a schematic view showing the fuel cell provided with the intermediate gas header 26.

In the fuel cell, the intermediate gas headers 26 and the intermediate spacers 30 are stacked and arranged to be interposed and positioned between the laminate cells 28 which are formed by laminating a plurality of individual cells. Also, gas-tight bellows 17a, 17b, 17c and 17d are arranged on the top side in the stacking direction. The respective manifold portions 14 and 15 and the active portion 16 are sealingly fastened and fixed by fastening plates 19a and 19b and fastening rods 20a and 20b. Each of the manifold portions 14 and 15 and the active portion 16 is adjusted by the gas-tight bellows 17a, 17b, 17c and 17d so that its compression is suitably set. As shown in FIG. 15, a size of the intermediate spacer 30 is formed to be equal to or larger than an outer dimension of the active portion 16 of the unit fuel cell laminate cell 28. The intermediate spacer 30 is arranged away from the intermediate gas header 26 forming a part of the manifold portion 14, 15. The intermediate spacer 30 is made of electric conductive material for electric connection between the unit fuel cell laminate cells 28.

In the fuel cell thus constructed, the fuel gas or oxidant gas supplied from the outside of each intermediate gas header 26 is introduced into the manifold portion of the unit fuel cell laminate cell 28. Thereafter, the gas is supplied to the channel portions for cell reaction. Thereafter, the gas is caused to pass through the fuel gas or oxidant gas discharge manifold portion to be collected to the intermediate gas header 26 to be discharged to the outside of an outer shell 21 through gas discharge pipes 27a and 27b.

As described above, in this arrangement, each contact surface pressure is controlled to an optimum condition by selectively setting the fastening forces of the gas-tight bellows 17a, 17b, 17c and 17d for the manifold portions 14 and 15 and the active portion 16. Accordingly, by setting the contact surface pressure of the manifold portions 14 and 15 at a higher level than that of the contact surface pressure of the active portion 16, it is possible to keep a good gas seal for the manifold portions.

Also, in the fuel cell having such an arrangement, the respective components such as electrolyte tiles forming the unit cells would be deformed due to creep to reduce the overall vertical height. In this case, the reduction in height may be absorbed by the contraction of the extendable joint pipes 29 disposed vertically, and may be absorbed by the extension of the gas-bellows 17a, 17b, 17c and 17d in the manifold portions 14 and 15 and the electromotive (active) portion 16.

In the embodiment, the fastening force of the manifold portions 14 and 15 is set at a higher level than that of the active portion 16 to thereby bring the gas seal for the manifold portions into a good condition. However, for instance, depending upon the stacking condition of the fuel cells, it is possible to inversely set the fastening force of the active portion 16 at a level higher than or equal to that of the manifold portions 14 and 15.

The fuel cell in accordance with the sixth embodiment is not limited to the structure shown above, but it is possible to modify it without departing from spirit of the invention. For example, it is possible to modify the arrangement so that the fuel gas supply pipe 26a and the oxidant gas discharge pipe 26b are disposed on one side of the intermediate gas header 26 body, and the oxidant gas supply pipe 26b and the fuel gas supply pipe 26a are disposed on the other side (opposite side) thereof to provide a structure of counterflow of the fuel gas and oxidant gas.

In accordance with the invention, since the plurality of seal members which contribute the structure for sealing the manifold portions are fastened so that their contact surfaces are brought into contact with each other substantially in the stacking direction to thereby perform the gas seal of the manifold portion, it is possible to prevent the thermal stresses caused by the difference in thermal expansion of the plurality of seal members. Accordingly, in the temperature elevating/decreasing process upon the operation of the fuel cell, it is possible to avoid the generation of damages (fractures) of the manifold rings or the like to insure a high gas seal property with high reliability.

In particularly, in the case where the spacer having a sufficient rigidity against the pressure produced by the manifold portion fastening means is disposed in the gas channel of the fastening portion for attaining the gas seal of the manifold portions, in the case where a material is selected so that at least one of the plurality of seal members is deformed in the fastening direction, or in the case where at least one surface of the contact surfaces of the plurality of seal members is non-flat, it is possible to keep a high gas seal property with high reliability.

Furthermore, in the structure for sealing the manifold portions, since all the separator elements are not connected through the manifold rings, it is easy to carry out the lamination and arrangement of he unit cells and the separator elements, and also, when the fault is found in a part of the unit cells after the lamination and arrangement, it is easy to dismount it and interchange it by new one for the unit cells or separator elements.

Also, the manifold portion fastening and sealing means and the unit cell active portion fastening portions are separately and independently structured, and the pressure of the manifold portion fastening means is set to be larger than that of the unit cell active portion fastening portion, whereby it is possible to perform a high gas seal with high reliability also for the manifold portions.

What is claimed is:

1. A fuel cell comprising:

a plurality of unit cells stacked in layers, each of said unit cells including an electrolyte, a pair of electrodes, a first primary surface and a second primary surface;

a plurality of separator elements interposed between fuel gas channel in fluid communication with said first primary surface of each of said unit cells and an oxidant gas channel in fluid communication with said second primary surface of each of said unit cells; and manifold portions, each of said manifold portions contacting said separator elements to form a gas-tight fluid communication with said fuel gas channel and said oxidant gas channel via holes formed in said separator elements, each of said manifold portions including a dielectric manifold ring, a spacer arranged between a pair of the separator elements so that the spacer contacts the pair of separator elements, and a manifold portion fastener for fastening said manifold portion by pressing the pair of separator elements toward the spacer so that opposite surfaces of said spacer contact respective surfaces of the pair of separator elements.

2. The fuel cell according to claim 1, wherein each of said manifold portions further includes a seal member between said manifold ring and a surface of one of the separator elements.

3. The fuel cell according to claim 2, wherein said seal member includes an elastically deformable metal seal ring for exerting a restoring force against the pressing of said manifold portion fastener.

4. The fuel cell according to claim 1, wherein said spacer has sufficient rigidity to withstand the pressing of said manifold portion fastener.

5. The fuel cell according to claim 1, wherein each of said unit cells includes an active portion for generating electric power with a fuel gas and an oxidant gas supplied respectively through said fuel gas channel and said oxidant gas channel.

6. The fuel cell according to claim 5, further comprising an active portion fastener for fastening said active portion of each of said unit cells in a stacking direction between said separator elements.

7. The fuel cell according to claim 6, wherein a fastening pressure of said manifold portion fastener is larger than a fastening pressure of said active portion fastener.

8. The fuel cell according to claim 1, further comprising an intermediate gas header branching from a pair of said manifold portions for connecting said pair of manifold portions in the stacking direction.

9. The fuel cell according to claim 4, wherein said spacer is made of heat-resistive metal.

10. The fuel cell according to claim 4, wherein said spacer is made of a ceramic.

11. The fuel cell according to claim 9, wherein said heat-resistive metal is an alloy mainly composed of a metal selected from a group essentially consisting of stainless steel material, a Ni based alloy material and a Cr based alloy material.

12. The fuel cell according to claim 10, wherein said ceramic is selected from a group essentially consisting of alumina, zirconia and magnesia.

13. The fuel cell according to claim 2, wherein said seal member includes a seal ring body and a spring member incorporated in said seal ring body.

14. The fuel cell according to claim 2, wherein said seal member and said surface of one of the separator elements are bonded to each other.

15. The fuel cell according to claim 4, wherein said spacer is incorporated in the separator elements.

16. The fuel cell according to claim 1, wherein fine ceramic particles are interposed between the separator elements and said spacer on at least one of contact surfaces and peripheral surfaces of the separator elements and said spacer.

17. The fuel cell according to claim 1, wherein glass having a low melting point is interposed between the separator elements and said spacer on at least one of contact surfaces and peripheral surfaces of the separator elements and said spacer.

18. The fuel cell according to claim 1, wherein the manifold portion includes first and second metal plate rings arranged on opposite sides of the manifold ring.

19. The fuel cell according to claim 18, wherein a thickness of an outer circumferential portion of the manifold ring is larger than that of an inner circumferential portion of the manifold ring, and a thickness of an outer circumferential portion of the first and second plate rings is smaller than that of an inner circumferential portion of the first and second plate rings.

20. The fuel cell according to claim 18, wherein an outer circumferential portion of the first and second plate rings is thinner than an inner circumferential portion of the first and second plate rings.

21. The fuel cell according to claim 1, wherein said manifold portion fastener uses fluid pressure to provide said pressing.

22. The fuel cell according to claim 21, wherein said manifold portion fastener comprises:

an upper fastening plate and a lower fastening plate arranged in a stacking direction at end portions of a fuel cell stack formed by laminating the plurality of unit cells and the plurality of separator elements;

fastening rods for holding and fixing a predetermined positional relation of said upper fastening plate, said lower fastening plate and said fuel cell stack;

gas-tight bellows arranged between said fuel cell stack and said upper fastening plate; and fluid supply means for supplying fluid to said gas-tight bellows.

23. The fuel cell according to claim 21, wherein said manifold portion fastener comprises:

an upper fastening plate and a lower fastening plate arranged in a stacking direction at end portions of a fuel cell stack formed by laminating the plurality of unit cells and the plurality of separator elements;

spring members for applying compression force in the stacking direction to said fuel cell stack; and fastening rods for holding and fixing a predetermined positional relation of said fuel cell stack between said upper fastening plate and said lower fastening plate.

24. A fuel cell comprising:

a plurality of unit cells stacked in layers, each of said unit cells including an electrolyte, a pair of electrodes, a first primary surface, and a second primary surface;

a plurality of separator elements interposed between adjacent pairs of the unit cells, the separator elements forming a fuel gas channel in fluid communication with said first primary surface of each of said unit cells and an oxidant gas channel in fluid communication with said second primary surface of each of said unit cells; and manifold portions, each of said manifold portions contacting said separator elements to form a gas-tight fluid communication with said fuel gas channel and said oxidant gas channel via holes formed in said separator elements, each of said manifold portions including a dielectric manifold ring, a spacer, and a manifold portion fastener for fastening said manifold portion by pressing surfaces of an associated pair of the separator elements against surfaces of the spacer member so that the surfaces of said associated pair of spacer members and the surfaces of said separator element are held in contact with each other.

25. The fuel cell according to claim 24, wherein said spacer has sufficient rigidity to withstand fastening pressure of said fastener.

26. A fuel cell comprising:

a plurality of unit cells stacked in layers, each of said unit cells being adapted to receive a fuel gas and an oxidant gas to generate electric power;

a plurality of separator elements interposed and electrically connected between adjacent pairs of the unit cells to form a stacked structure; and manifold portions, each of said manifold portions contacting said separator elements to pass said fuel gas and said oxidant gas in a sealed manner through holes formed in said separator elements;

each of said manifold portions including a manifold ring, a spacer arranged in contact with a pair of the separator elements, and a manifold portion fastener for fastening the manifold portion by pressing surfaces of an associated pair of the separator elements against surfaces of said spacer so that the surfaces of said spacer and the surfaces of said associated pair of the separator elements are held in contact with each other.

* * * * *

UNITED STATES PATENT AND TRADEMARK OFFICE
CERTIFICATE OF CORRECTION

PATENT NO. : 5,532,073
DATED : July 02, 1996
INVENTOR(S) : Haruhiko HIRATA et al.

It is certified that error appears in the above-indentified patent and that said Letters Patent is hereby corrected as shown below:

Title page, item [57]
In the Abstract, line 14, "ring" should read --rings--.

Claim 1, column 12, line 47, after "between", insert --adjacent pairs of the unit cells, the separator elements forming a--.

Signed and Sealed this

Eighth Day of April, 1997

Attest:

BRUCE LEHMAN

Attesting Officer

Commissioner of Patents and Trademarks